United States Patent
Aldridge et al.

(10) Patent No.: US 10,939,248 B1
(45) Date of Patent: Mar. 2, 2021

(54) ANTI-POACHING DEVICE

(71) Applicant: INTERNATIONAL BUSINESS MACHINES CORPORATION, Armonk, NY (US)

(72) Inventors: Mary Kathryn Aldridge, Washington, DC (US); Michael James McGuire, Sydney (AU); James David Cleaver, Grose Wold (AU); Thuy Luong, Kellyville (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/790,881

(22) Filed: Feb. 14, 2020

(51) Int. Cl.
| | |
|---|---|
| H04W 24/00 | (2009.01) |
| H04W 4/029 | (2018.01) |
| G06N 20/00 | (2019.01) |
| G06N 5/04 | (2006.01) |
| A01K 29/00 | (2006.01) |
| G05D 1/02 | (2020.01) |

(Continued)

(52) U.S. Cl.
CPC ............ H04W 4/029 (2018.02); A01K 29/00 (2013.01); G05D 1/0276 (2013.01); G06N 5/04 (2013.01); G06N 20/00 (2019.01); *A01K 11/008* (2013.01); *G06Q 50/265* (2013.01)

(58) Field of Classification Search
CPC ...... H04W 4/029; H04W 88/02; G06N 20/00; G06N 5/04; A01K 29/00; A01K 11/008; G05D 1/0276; G06O 50/265; H04M 1/72519; H04M 1/72522

USPC ................................. 455/456.1, 550.1, 424
See application file for complete search history.

(56) References Cited

U.S. PATENT DOCUMENTS

| | | | |
|---|---|---|---|
| 7,848,517 B2 | 12/2010 | Britz et al. | |
| 8,713,846 B1* | 5/2014 | Thrash ................. | A01M 31/06 43/2 |
| 9,356,727 B2 | 5/2016 | Immendorf et al. | |

(Continued)

FOREIGN PATENT DOCUMENTS

| | | |
|---|---|---|
| CN | 107018362 A | 8/2017 |
| IN | 201841045515 | 12/2018 |

OTHER PUBLICATIONS

Mell et al., "The NIST Definition of Cloud Computing", Recommendations of the National Institute of Standards and Technology, NIST Special Publication 800-145, Sep. 2011, 7 pages.

(Continued)

*Primary Examiner* — Danh C Le
(74) *Attorney, Agent, or Firm* — Robert D. Bean

(57) ABSTRACT

According to one embodiment, a method, computer system, and computer program product for decoying poachers away from an animal equipped with a tracking device is provided. The present invention may include generating, based on machine learning and movement patterns of the tracked animal, one or more decoy paths; transmitting instructions to one or more decoy transmitters to simulate characteristics of the tracking device, and to simulate the decoy paths by moving to and/or transmitting decoy signals at sequential locations at corresponding times to imitate signals from the tracking device; and, responsive to determining that the one or more decoy transmitters are not capable of simulating all of the decoy paths, removing one or more decoy paths.

17 Claims, 5 Drawing Sheets

(51) Int. Cl.
    *A01K 11/00*         (2006.01)
    *G06Q 50/26*         (2012.01)

(56) References Cited

U.S. PATENT DOCUMENTS

| | | |
|---|---|---|
| 2005/0041728 A1 | 2/2005 | Karlsson |
| 2016/0057610 A1* | 2/2016 | Cronin ................. H04W 12/06 375/259 |
| 2016/0174541 A1* | 6/2016 | Goodman ............. A01M 31/00 43/3 |
| 2016/0219867 A1* | 8/2016 | Schauer ............... A01M 31/06 |
| 2017/0214486 A1 | 7/2017 | Choi et al. |
| 2018/0192621 A1* | 7/2018 | Valatka .................... A01K 1/00 |
| 2018/0192638 A1* | 7/2018 | Denmon ............... A01M 31/06 |
| 2019/0250602 A1* | 8/2019 | DeLoach, III ....... G08B 21/182 |
| 2020/0022360 A1* | 1/2020 | Priest ................... A01M 31/06 |
| 2020/0047218 A1* | 2/2020 | Cherry ..................... B07C 5/10 |
| 2020/0146279 A1* | 5/2020 | Young .................. A01M 31/06 |

OTHER PUBLICATIONS

O'Donoghue et al., "Real-time anti-poaching tags could help prevent imminent species extinctions", Journal of Applied Ecology, 2016, vol. 53, pp. 5-10.

Cheteni, "An analysis of anti poaching techniques in Africa: A case of rhino poaching", Munich Personal RePEc Archive, Feb. 10, 2014, MPRA Paper No. 59031, 25 pages.

Good, "6 Super Creative Anti-Poaching Tactics That Just Might Save the World's Most Endangered Species", One Green Planet Newsletter, 2014, 13 pages.

\* cited by examiner

ANTI-POACHING DEVICE

BACKGROUND

The present invention relates, generally, to the field of computing, and more particularly to environmental conservation.

Poaching is a ubiquitous problem for endangered species ranging from the vast African wilderness to the Pacific Ocean. Some of the planet's most charismatic species, such as rhinos, elephants, and tigers, face extinction due to the relentless activity of poachers. Many modern technologies have been leveraged in attempting to devise useful anti-poaching measures; one such example is the use of tracking devices to study and monitor endangered animal populations. However, in some cases, this creates a problem where poachers utilize signals emanating from the tracking devices to locate the endangered animals.

SUMMARY

According to one embodiment, a method, computer system, and computer program product for decoying poachers away from an animal equipped with a tracking device is provided. The present invention may include generating, based on machine learning and movement patterns of the tracked animal, one or more decoy paths; transmitting instructions to one or more decoy transmitters to simulate characteristics of the tracking device, and to simulate the decoy paths by moving to and/or transmitting decoy signals at sequential locations at corresponding times to imitate signals from the tracking device; and, responsive to determining that the one or more decoy transmitters are not capable of simulating all of the decoy paths, removing one or more decoy paths.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
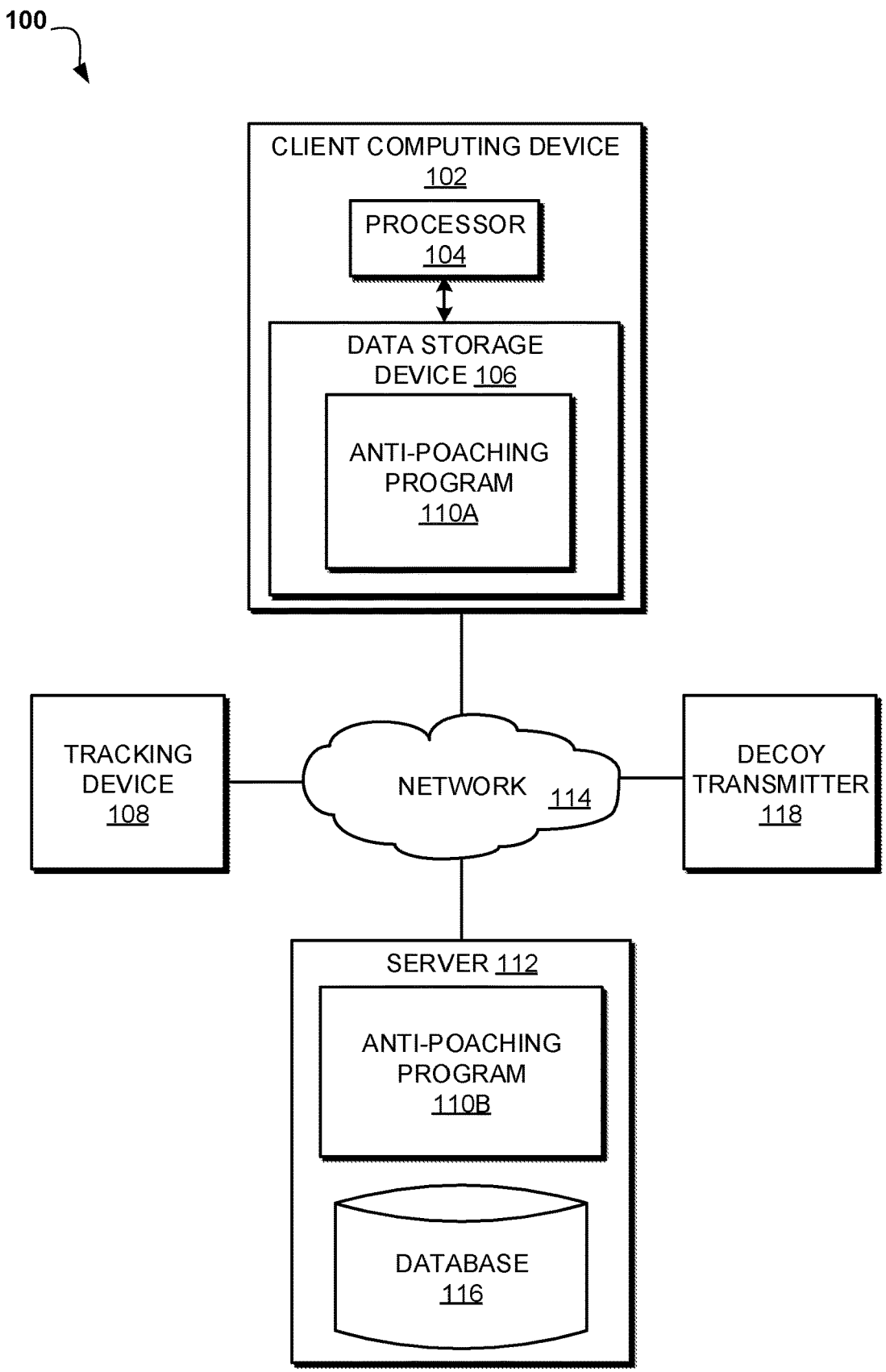
FIG. 1 illustrates an exemplary networked computer environment according to at least one embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to environmental conservation. The following described exemplary embodiments provide a system, method, and program product to, among other things, learning the behaviors of tracked animals and mimicking the tracked behavior via decoy signals to decoy poachers away from animals. Therefore, the present embodiment has the capacity to improve the technical field of environmental conservation by addressing a known and exploited vulnerability of current anti-poaching technologies.

As previously described, poaching is a pervasive problem for endangered species ranging from the vast African wilderness to the Pacific Ocean. Some of the planet's most charismatic species, such as rhinos, elephants, and tigers, face extinction due to the relentless activity of poachers. Endangered species often roam in large areas and are difficult to protect, and confrontations between conservationists and poachers are becoming increasingly violent in many cases. Modern technologies have been leveraged in attempting to improve anti-poaching measures; one such example is the use of tracking devices to study and monitor endangered animal populations, allowing conservationists to track the animals across large areas. However, in some cases, this creates a problem where poachers utilize signals emanating from the tracking devices to locate the endangered animals. As such, it may be advantageous to, among other things, implement a system that mimics animal behaviors via fake tracking signals to decoy poachers away from the animals, potentially saving the animal's lives without exposing enforcement personnel to potentially violent confrontations with poachers.

According to at least one embodiment, the invention is a method of learning the behaviors of tracked animals as evidenced by signals from tracking devices attached to the animals, and transmitting, via an array of mobile and/or stationary decoy transmitters, dummy signals corresponding with non-existent animals in order to decoy poachers away from tracked animals.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to learning the behaviors of tracked animals and mimicking the tracked behavior via decoy signals to decoy poachers away from animals.

Referring to FIG. 1, an exemplary networked computer environment 100 is depicted, according to at least one embodiment of the present invention. The networked computer environment 100 may include client computing device 102, a server 112, a tracking device 108 and a decoy transmitter 118 interconnected via a communication network 114. According to at least one implementation, the networked computer environment 100 may include a plurality of client computing devices 102, servers 112, tracking devices 108, and decoy transmitters 118, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Tracking device 108 may include any device capable of collecting movement patterns of an animal over a set period of time, and transmitting these movement patterns to client computing device 102 or server 112, for instance via network 114, at predetermined intervals. The tracking device 108 may be attached to an animal such that the location of the tracking device indicates the location of the animal. In some embodiments, the tracking device 108 may encrypt the data transmitted to client computing device 102. In some embodiments, the movement patterns may merely include the location of the animal at a given moment in time, but may contain further information, such as more granular location information recorded at shorter intervals than the transmit events, the heading and/or speed of the animal, et cetera. In some embodiments, tracking device 108 may only be capable of transmitting movement patterns, and may be incapable of receiving commands from network 114, or of storing movement patterns locally.

Decoy transmitter 118 may include any device capable of transmitting a dummy signal similar to the signal transmitted by tracking device 108, and may be in communication with client computing device 102 or server 112, for instance via network 114. Decoy transmitter 118 may be located at a fixed position, or may be mobile. For example, decoy transmitter 118 may be integrated into a mobile drone. In some embodiments, decoy transmitter 118 may be capable of varying the signal strength of the dummy signals.

Client computing device 102 may include a processor 104 and a data storage device 106 that is enabled to host and run an anti-poaching program 110A and communicate with the server 112, tracking device 108, and decoy transmitter 118 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running an anti-poaching program 110B and a database 116 and communicating with the client computing device 102, tracking device 108, and decoy transmitter 118 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the anti-poaching program 110A, 110B may be a program capable of learning the behaviors of tracked animals and mimicking the tracked behavior via decoy signals to decoy poachers away from animals. The anti-poaching program 110A, 110B may be located on client computing device 102 or server 112 or on any other device located within network 114. Furthermore, the anti-poaching program 110A, 110B may be distributed in its operation over multiple devices, such as client computing device 102 and server 112. The anti-poaching method is explained in further detail below with respect to FIG. 2.

Figure 2:
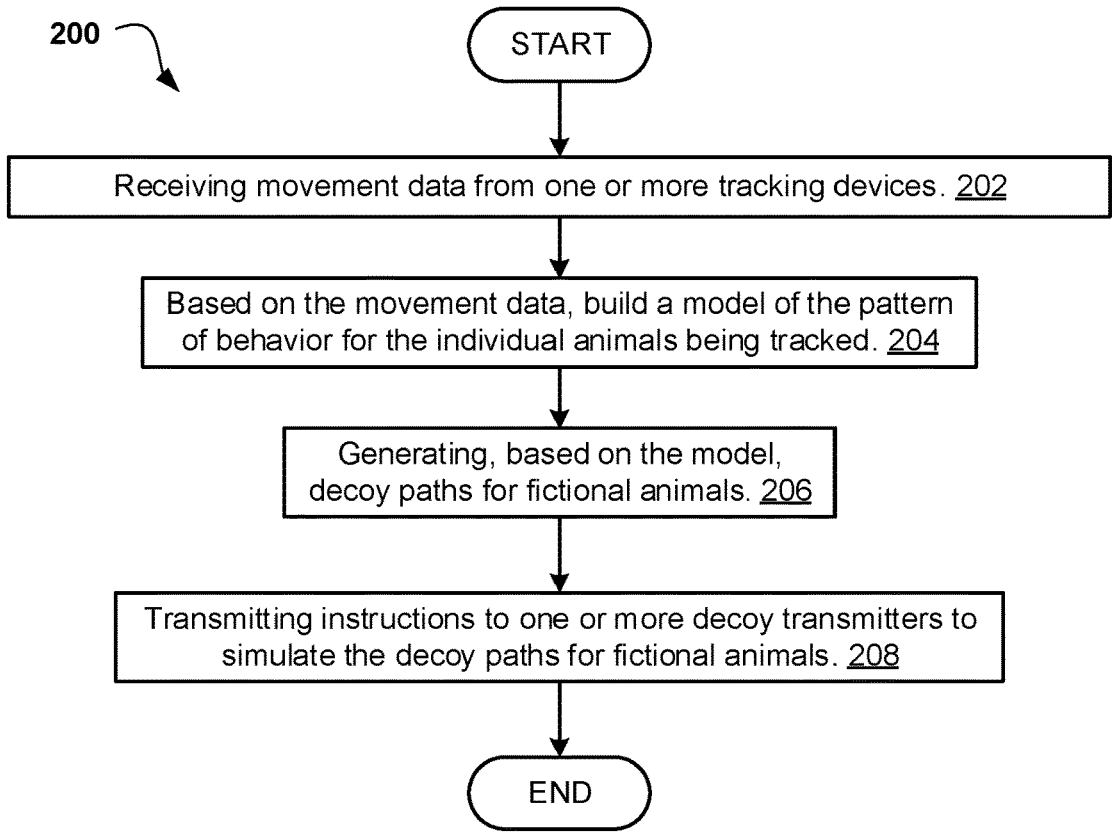
FIG. 2 is an operational flowchart illustrating an anti-poaching process according to at least one embodiment of the present invention.

Referring now to FIG. 2, an operational flowchart illustrating an anti-poaching process 200 is depicted according to at least one embodiment of the present invention. At 202, the anti-poaching program 110A, 110B receives movement patterns from one or more tracking devices 108. The movement patterns from each of the tracking devices 108 may pertain to the individual animal to which that tracking device 108 is attached or otherwise monitoring. In some embodiments, the movement patterns may merely include the location of the animal at a given moment in time, but in other embodiments may contain additional information, such as more granular location information recorded at shorter intervals than the transmit events, the heading and/or speed of the animal, et cetera.

At 204, anti-poaching program 110A, 110B may, based on the movement patterns, build a model of the pattern of behavior for the individual animals being tracked; the anti-poaching program 110A, 110B may employ a machine learning schema, by utilizing the movement patterns as a known training dataset to build a mathematical model that is capable of identifying patterns in the training dataset and utilizing those patterns to make predictions about the output values corresponding with new data. As more training data (movement patterns) is collected, the mathematical model may improve the accuracy of its predictions. Using the machine learning model, anti-poaching program 110A, 110B may make inferences from the past movement patterns about how the animal will behave in the future. For instance, the anti-poaching program 110A, 110B may identify the average speed at which the animals travel, and/or factors that may affect the speed of the animal such as weather, time of day, presence of predators or prey in the region, how many companions the animal is traveling with, terrain, et cetera, and predict the speed at which the animal may travel when exposed to those factors in the future. The anti-poaching program 110A, 110B may further identify the influence of landmarks such as water sources, food sources, nesting sites, favored habitats, the presence of potential mates, et cetera, on the movement patterns of the animal, and predict future movement patterns based on those influences. The anti-poaching program 110A, 110B may learn how animals move both on a day to day basis, and on longer timescales, such as seasonally or yearly. The anti-poaching program 110A, 110B may extrapolate animal movement patterns from current and past tracked individuals within the system, from historical data recorded by other systems, or any source relevant to animal movement patterns.

In some embodiments, the anti-poaching program 110A, 110B may learn the performance characteristics of the tracking devices 108, such as the signal strength of the signal that the tracking device 108 transmits, the characteristics of the signal that tracking device 108 transmits, the schedule or intervals at which the tracking device 108 transmits, the failure rate of transmissions from tracking device 108, et cetera. The anti-poaching program 110A, 110B may learn performance characteristics for individual tracking devices 108 and/or for particular models of tracking device 108. For example, the anti-poaching program 110A, 110B may observe or learn from historical data or other sources that a particular model of solar-powered tracking device 108 waxes and wanes in signal strength depending on the time of day and brightness of the sun, or that an individual tracking device 108 fails to transmit 15% of the times it is scheduled to transmit.

At 206, anti-poaching program 110A, 110B may generate, based on the model, decoy paths for fictional animals. The anti-poaching program 110A, 110B may take the learnt behavior from the learning system, and plot a number of paths for each of a number of fictional animals, where the paths are paths that the tracked animal could plausibly take, such that the signals from the tracking device 108 describing the path of a real animal and the signals from the one or more decoy transmitters 118 describing the path of a fictional animal are difficult to distinguish from each other. To this end, it may be desirable to create as many decoy paths as possible, as the more decoy paths, the less likely a poacher would be to identify the signals corresponding with the real animal. The anti-poaching program 110A, 110B may further plot out the logistical steps necessary to create the paths for the fictional animals; this may entail determining the times and places at which decoy transmitters 118 must transmit to. The decoy path may include a series of sequential locations, each corresponding with a particular time, where a decoy transmitter 118 must transmit a decoy signal imitating the signal from the tracking device 108 so that the transmission events occur at distances and times calculated to create the illusion of a tracked animal traveling at a plausible speed, and where the location of the transmission points describe a plausible path for the animal to take.

In some embodiments the anti-poaching program 110A, 110B may generate decoy paths for fictional animals based at least in part on the number and capability of decoy transmitters 118 available, such that the generated decoy paths do not exceed the available decoy transmitter 118's ability to simulate. For example, anti-poaching program 110A, 110B may not generate a particular path, or may remove a generated path that has already been generated, if anti-poaching program 110A, 110B determines that the mobile decoy transmitters 118 do not have the range or speed to reach transmission points in time to convincingly simulate an animal, or if the number of available decoy transmitters 118 is insufficient to transmit at enough transmission points of the generated decoy path.

At 208, anti-poaching program 110A, 110B may transmit instructions to one or more decoy transmitters to simulate the generated decoy paths for fictional animals. The anti-poaching program 110A, 110B may transmit instructions to each of a number of decoy transmitters 118 to execute the generated decoy paths for fictional animals. The anti-poaching program 110A, 110B may transmit the times at which individual fixed decoys need to transmit, the times and locations at which any mobile decoy transmitters need to transmit, as well as the movement commands necessary to navigate the mobile decoy transmitters 118 to the correct locations by the correct time. In cases where transmission points along the generated decoy path of a fictional animal are close but not at the same location as a decoy transmitter 118, and, for instance where the decoy transmitter 118 is stationary or is mobile but cannot reach the point in time, the anti-poaching program 110A, 110B may instruct decoy transmitter 118 to alter the strength of the signal it transmits such that the decoy signal's point of origin appears to be the planned transmission point along the decoy path, rather than at the location of the decoy transmitter 118.

In some embodiments, the anti-poaching program 110A, 110B may stagger the execution of the decoy paths in time, such that no number of decoy paths above a threshold begin or end at the same time. The anti-poaching program 110A, 110B may connect multiple decoy paths to keep the decoy paths going as long as possible, so that any individuals monitoring the signal would have increased difficulty in isolating signals from the tracking device on the real animal.

In some embodiments, the anti-poaching program 110A, 110B may, in transmitting instructions to the decoy transmitters, further take into account the performance characteristics of the tracking device 108 to more convincingly imitate all aspects of the data transmitted from the tracked animal. For instance, if the tracking device 108 fails to transmit at a certain percentage of the time, anti-poaching program 110A, 110B may purposefully omit transmit events from the decoy paths a similar percentage of the time to simulate the failure rate. The anti-poaching program 110A, 110B may further mimic the signals of the individual tracking device 108 or of that model of tracking device 108, and/or may mimic the transmission intervals, signal strength, et cetera. The anti-poaching program 110A, 110B may mimic the signals of individual tracking device 108 for instance by using the same encryption, mimicking identification codes or other identifiers such as information pertaining to the tracked animal (name/identification number, species, et cetera), or other signal content.

Figure 3:
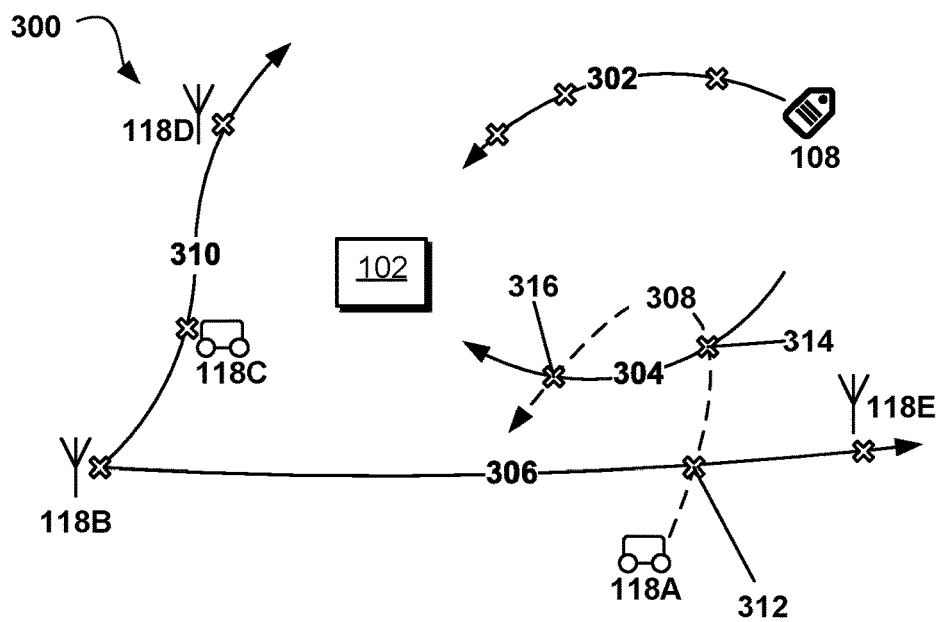
FIG. 3 illustrates a use case of the anti-poaching process according to at least one embodiment of the present invention.

Referring now to FIG. 3, a use case 300 of the anti-poaching process 200 is depicted according to at least one embodiment of the present invention. Here, tracking device 108, which is attached to an endangered animal, is moving along path 302, transmitting its location at intervals to client computing device 102 running anti-poaching program 110A, where each transmission event is indicated by an 'x.' Based on the movement patterns of the animal tracked by tracking device 108, the anti-poaching program 110A communicates instructions to decoy transmitters 118 to transmit dummy signals at predetermined locations and times to describe three decoy animal paths, one at 304, one at 306, and one at 310. Decoy transmitters 118A and 118C are mobile, while decoy transmitters 118B, 118D, and 118E are stationary. At time=0, decoy transmitter 118A sends a signal at 312 as part of decoy animal path 306. By time=3, decoy transmitter 118A has moved to point 314 along an instructed movement path 308, where it transmits a signal as part of decoy animal path 304. By time=5, decoy transmitter 118A has moved to a second point 316 in decoy animal path 304, where it transmits a signal. Mobile decoy transmitter 118C may be pre-emptively moved to a location where it would be positioned for the next signal, and wait to transmit a signal as part of decoy animal path 310. Stationary decoy transmitter 118B may transmit a signal as part of both decoy animal path 310 and decoy animal path 312.

It may be appreciated that FIGS. 2-3 each provide only illustrations of one implementation and do not imply any limitations with regard to how different embodiments may be implemented. Many modifications to the depicted environments may be made based on design and implementation requirements. For instance, while the embodiments may seem to be directed towards terrestrial animals, one of ordinary skill of the art would understand the invention to apply equally to all animals. For instance, in use cases where the animal tracked via tracking device 108 is aquatic, the method applies equally, and decoy transmitters 118 may be buoys or undersea drones. In cases where the animal tracked via tracking device 108 is aerial or arboreal, the method applies equally and decoy transmitters 118 may comprise aerial drones transmitting at particular altitudes to mimic heights to which that animal may climb or fly.

Figure 4:
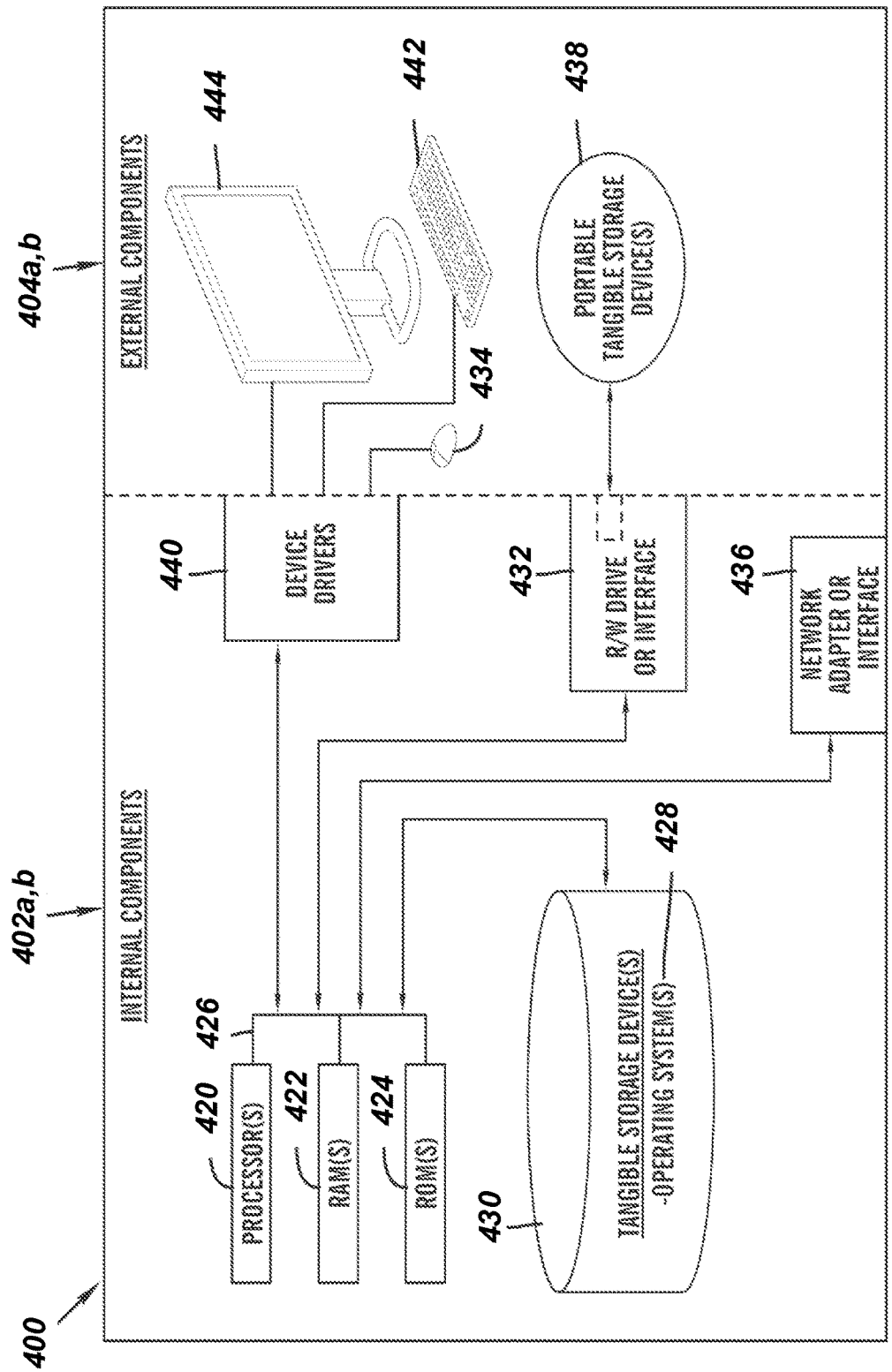
FIG. 4 is a block diagram of internal and external components of computers and servers depicted in FIG. 1 according to at least one embodiment of the present invention.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428 and the anti-poaching program 110A in the client computing device 102, and the anti-poaching program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the anti-poaching program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The anti-poaching program 110A in the client computing device 102 and the anti-poaching program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the anti-poaching program 110A in the client computing device 102 and the anti-poaching program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
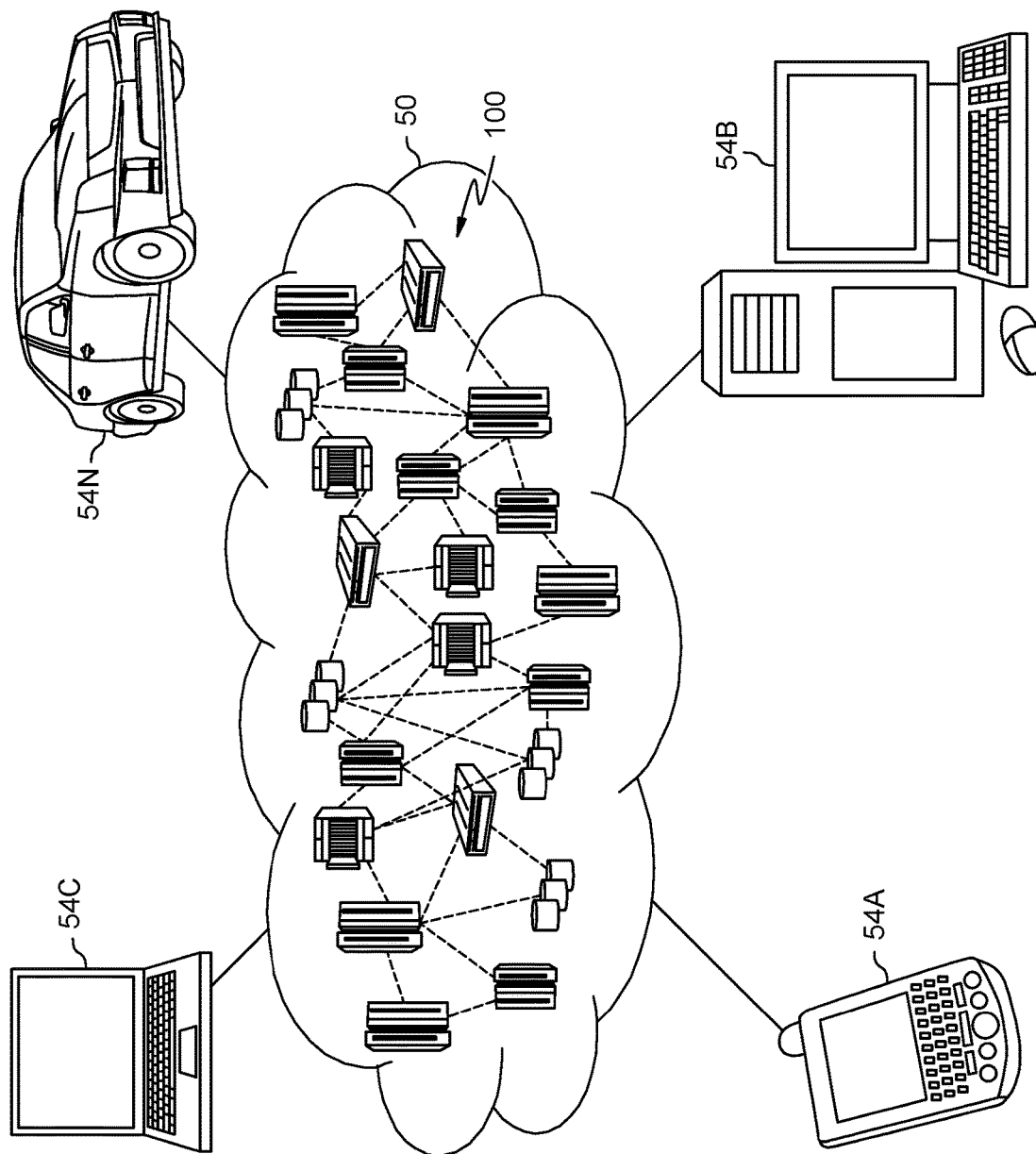
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
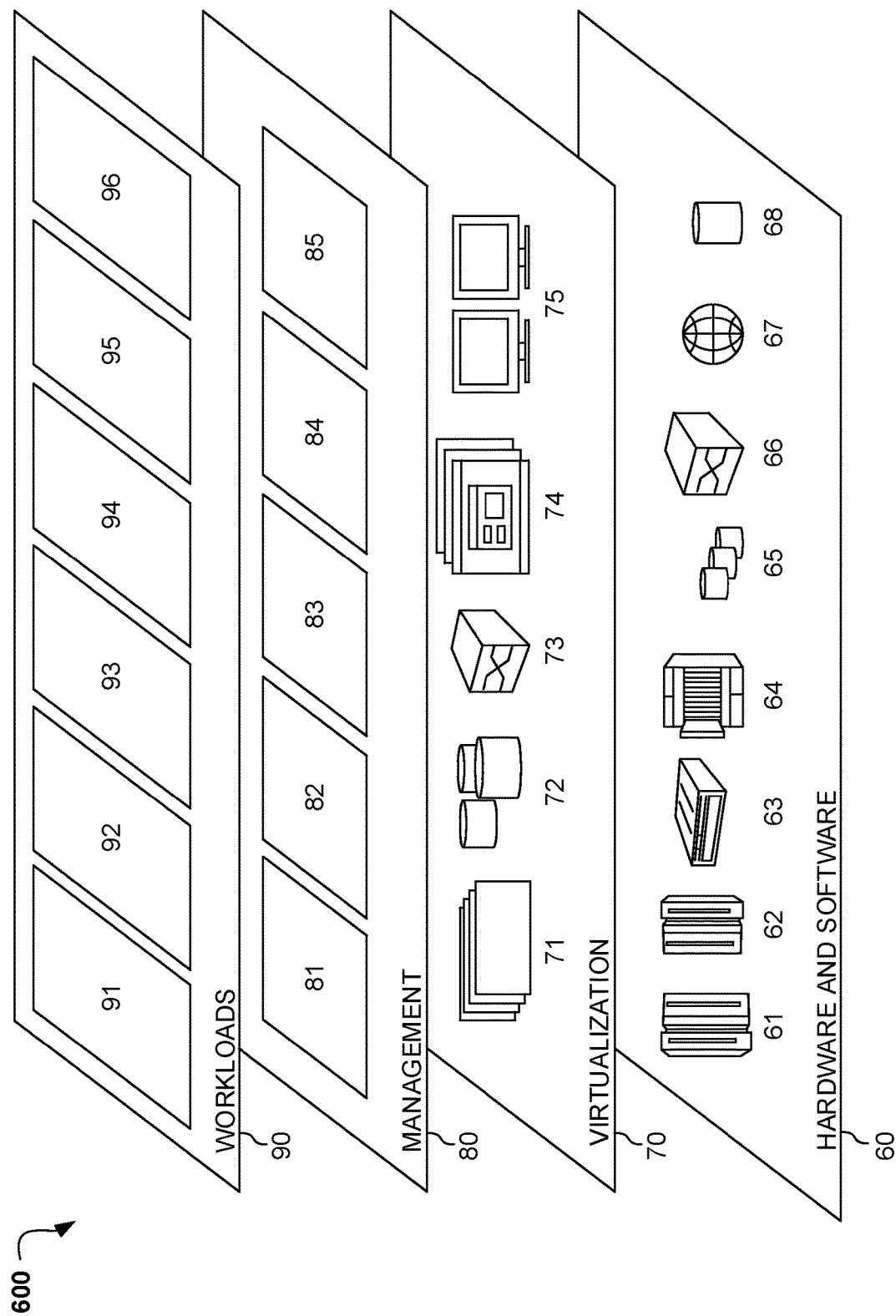
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and anti-poaching 96. Anti-poaching 96 may relate to learning the behaviors of tracked animals and mimicking the tracked behavior via decoy signals to decoy poachers away from animals.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for operating one or more decoy transmitters to simulate the movement patterns of a tracking device, the method comprising:
   generating, based on the movement patterns of the tracking device, a decoy path;
   transmitting one or more instructions to one or more decoy transmitters to simulate the decoy path; and
   altering, by the one or more decoy transmitters, the strength of a decoy signal to simulate a point of origin of the decoy signal along one of the one or more decoy paths.

2. The method of claim 1, wherein simulating the decoy paths comprises:
   transmitting, by the one or more decoy transmitters, one or more decoy signals at one or more sequential locations at a corresponding time to imitate one or more signals from the tracking device.

3. The method of claim 2, wherein the instructions comprise:
   instructions for one or more mobile decoy transmitters to move to one or more of the sequential locations by the corresponding time.

4. The method of claim 1, wherein the instructions comprise:
   simulating one or more performance characteristics of the tracking device.

5. The method of claim 1, wherein the generating is based on machine learning.

6. The method of claim 1, comprising:
   responsive to determining that the one or more decoy transmitters are not capable of simulating the one or more decoy paths, removing one or more decoy paths.

7. A computer system for operating one or more decoy transmitters to simulate the movement patterns of a tracking device, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   generating, based on the movement patterns of the tracking device, a decoy path;
   transmitting one or more instructions to one or more decoy transmitters to simulate the decoy path; and
   altering, by the one or more decoy transmitters, the strength of a decoy signal to simulate a point of origin of the decoy signal along one of the one or more decoy paths.

8. The computer system of claim 7, wherein simulating the decoy paths comprises:
   transmitting, by the decoy transmitters, one or more decoy signals at one or more sequential locations at a corresponding time to imitate one or more signals from the tracking device.

9. The computer system of claim 8, wherein the instructions comprise:
   instructions for one or more mobile decoy transmitters to move to one or more of the sequential locations by the corresponding time.

10. The computer system of claim 7, wherein the instructions comprise:
    simulating one or more performance characteristics of the tracking device.

11. The computer system of claim 7, wherein the generating is based on machine learning.

12. The computer system of claim 7, comprising:
    responsive to determining that the one or more decoy transmitters are not capable of simulating the one or more decoy paths, removing one or more decoy paths.

13. A computer program product for operating one or more decoy transmitters to simulate the movement patterns of a tracking device, the computer program product comprising:
    one or more computer-readable tangible storage medium and program instructions stored on at least one of the one or more tangible storage medium, the program instructions executable by a processor to cause the processor to perform a method comprising:
    generating, based on the movement patterns of the tracking device, a decoy path;
    transmitting one or more instructions to one or more decoy transmitters to simulate the decoy path; and
    altering, by the one or more decoy transmitters, the strength of a decoy signal to simulate a point of origin of the decoy signal along one of the one or more decoy paths.

14. The computer program product of claim 13, wherein simulating the decoy paths comprises:
    transmitting, by the decoy transmitters, one or more decoy signals at one or more sequential locations at a corresponding time to imitate one or more signals from the tracking device.

15. The computer program product of claim 14, wherein the instructions comprise:
    instructions for one or more mobile decoy transmitters to move to one or more of the sequential locations by the corresponding time.

16. The computer program product of claim 13, wherein the instructions comprise:
    simulating one or more performance characteristics of the tracking device.

17. The computer program product of claim 13, wherein the generating is based on machine learning.

* * * * *